United States Patent Office 3,420,315
Patented Jan. 7, 1969

3,420,315
ROLL-OVER TWO-WAY PLOW HAVING
NOVEL SAFETY STANDARD
Robert Richard Roth, Rock Island, Ill., assignor to
Deere & Company, Moline, Ill., a corporation of
Delaware
Filed Feb. 18, 1966, Ser. No. 528,439
U.S. Cl. 172—265                                9 Claims
Int. Cl. A01b 61/04

ABSTRACT OF THE DISCLOSURE

A plow bottom assembly for a roll-over two-way plow in which opposed right-hand and left-hand plow bottoms are interconnected by means of linkage to a single cylinder so that either plow bottom may trip against the force of the cylinder.

The present invention relates generally to agricultural implements and more particularly to two-way roll-over moldboard plows.

When plowing in rocky fields, it has been the practice for some years to employ so-called safety standards to prevent damage to the share of the plow or other portions should a large rock or other obstruction be encountered. Thus, when a large rock is encountered, the standard may trip or yield rearwardly, thereby letting the plow pass over the obstruction. These devices have been used in both one-way and two-way moldboard plows. Most forms of these devices can be reset when tripped by backing of the plow. In recent years the number of bottoms in a plow have been increasing as well as the speed of plowing which causes more frequent tripping. To overcome the increasing necessity of backing the plow to reset the tripped standards there has been developed a new form of safety device which will automatically reset a plow bottom when tripped. The most common form of this type of resetting device employs an extensible and retractable hydraulic cylinder and a plow bottom which is secured to a pivoted standard, the standard being able to swing upwardly against the compressive action of the hydraulic cylinder. This resetting device has been adopted for use in one-way plows, but has not been satisfactory for two-way plows for two reasons. One is that since each bottom must be provided with a cylinder, it would be necessary to provide two cylinders for every bottom which is plowing (one for the plowing bottom and one for the opposed non-plowing bottom), which would unduly increase the cost of the plow. A second reason is that as each bottom is fully tripped, it will swing upwardly past the centerline of the plow. While this is permissible on a one-way plow, in a two-way plow such upward movement would cause the tripped bottom to encounter the opposed bottom. To provide proper clearance for tripping in a two-way plow employing resetting devices of the old design, it would be necessary to provide greater vertical spacing between the frame and the bottoms, and such increased spacing would be undesirable.

Therefore, it is an object of the present invention to provide a safety standard for a two-way plow capable of resetting itself which is low in cost and employs a single extensible and retractable hydraulic cylinder for opposed bottoms. A further object of this invention is to provide a two-way plow having opposed right-hand and left-hand bottoms, the opposed bottoms being interconnected through linkage including a single hydraulic cylinder, whereby when one of the bottoms is tripped, the interconnecting linkage will cause the opposed bottom to swing upwardly with the tripped bottom, thereby providing sufficient trip clearance for the tripped bottom.

In carrying out the foregoing objects, an implement embodying the invention includes a generally fore-and-aft extending mounting frame rotatable about a generally fore-and-aft extending axis about which are mounted opposed right- and left-hand plow bottoms that are rotatable with the frame between right-hand and left-hand plowing positions. The plow bottoms are secured to the frame by means of standards which are rigidly secured at one end to the plow bottoms and are pivotally secured at the other end being pivotally secured to the mounting frame, the first link being pivotally secured to the mounting frame. An extensible and retractable hydraulic cylinder is disposed between the opposed first links with its forward end being pivotally secured to the mounting frame, the rear end of the cylinder being pivotally secured to one end of second links, each of the second links being pivotally secured at the other end to the first end of the first links. Third links are also provided, one end of each third link being pivotally secured to an intermediate portion of the second link and the other end of the third link being pivotally secured to the upper end of the standard. Finally, stop means are provided, the first stop being mounted on the first link and being cooperable with the standard and the second stop also being mounted on the first link and cooperable with the mounting frame, each of the stops limiting rotation in one direction.

The aforementioned and other objects and advantages of this invention will be apparent to those skilled in the art after a consideration of the following detailed description, taken in conjunction with the accompanying drawings in which the preferred form of this invention is illustrated.

Figure 1:
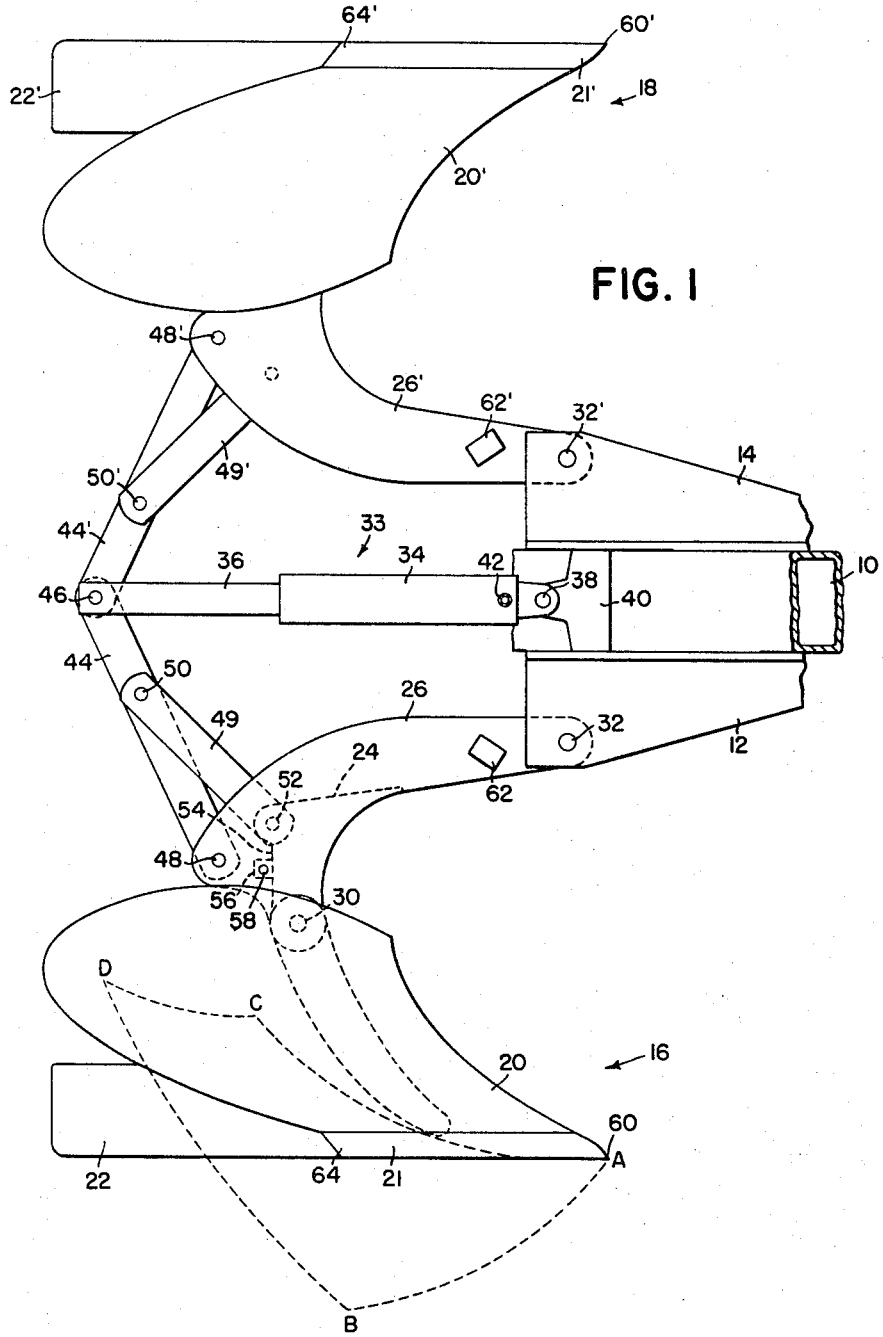
FIG. 1 is a side view of a two-way roll-over plow embodying the principles of this invention showing right-hand and left-hand bottoms in their normal working position, and also showing the area through which the point of the lower plow may pass when tripped.

Referring first to FIG. 1, the two-way roll-over plow of this invention is provided with a generally fore-and-aft extending mounting frame which is adapted to be secured to a propelling tractor in any conventional fashion and is rotatable about a fore-and-aft extending axis, the mounting frame including a generally fore-and-aft extending mounting beam 10 and opposed mounting brackets 12 and 14 rigidly secured to the beam. Right and left bottoms, indicated generally at 16 and 18, respectively, are interconnected with the mounting brackets 12 and 14, respectively. Since both the right- and left-hand bottoms are substantially the same only the right-hand bottom will be described below, but in the description of the operation which follows and in the drawings the same components of the left-hand bottom will be identified by primes. Each bottom is provided with earth-working apparatus including a moldboard 20, a plowshare 21, and a landside 22, the parts being rigidly secured to a frog (not illustrated) as is conventional. The frog is in turn rigidly secured to the standard 24. Each standard 24 is pivotally interconnected with its associated mounting bracket by means of a first link 26, the standard being apertured at an intermediate portion to receive a pivot pin 30 which is also pivotally received in a corresponding aperture in the lower rearward end of the first link 26. The forward end of the first link is apertured and receives another pivot pin 32 which interconnects the first link with the associated mounting bracket 12, 14.

An extensible and retractable hydraulic cylinder assembly 33 having a forward cylinder 34 and rearwardly projecting piston rod 36 is pivotally secured at its forward end by means of pivot pin 38 to a rearwardly extending cylinder support 40 which is rigidly secured to one side of the mounting beam 10 in a conventional fashion, such as by welding. The cylinder is provided with an inlet port 42 which is connected by means of a fluid line with a source of hydraulic fluid under pressure. The source of fluid may be a pump of a type shown in U.S. Patent 3,002,462 to Raymond, issued Oct. 3, 1961, or it may be an accumulator such as the type shown in U.S. Patent 3,172,481 to Trollsas, issued Mar. 9, 1965.

The cylinder assembly 33 is interconnected with both the right and left bottoms 16, 18 by means of identical linkage and to this end second links 44 are provided which are pivotally secured at one end by means of pin 46 to the rear end of the piston rod 36. The other end of the second link is pivotally secured by means of pin 48 to a rear end portion of the first link 26. A third link 49 is provided which is connected at its ends by means of pivot pins 50, 52 with an intermediate portion of the second link 44 and the upper end of the standard 24, respectively. The upper rear face 54 of the standard 24 is held in abutment with an adjustable stop 56 which is rotatable about pin 58 when the point 60 of the bottom is in its plowing position A. It should be noted that the stop is provided with a plurality of faces at varying distances from the pin 58.

In operation, during plowing, when no obstructions are being encountered, the piston 36 will be extended by fluid under pressure from the cylinder 34 as far as each of the linkages 26, 24, 49, 44, and 26', 24', 49', 44' permits. To this end it should be noted that the cylinder assembly 33 will hold the right and left moldboards 20, 20' in the position illustrated in FIG. 1 since the rearward directed force will force the pivot pin 46 to the rear which, in turn, pulls the pins 50, 50' and links 49, 49' to the rear, thereby causing the upper rear faces 54, 54' of the standards to abut against the stops 56, 56'. This establishes a rigid connection between the first, second, and third links as well as the standard. Further extension of the compressible force-applying means 33 will tend to cause each of the link standard assemblies to rotate about its forward pivot points 32, 32' away from the piston rod 36. As the compressible force-applying means 33 is connected to both right- and left-hand bottoms, they will assume the centered position illustrated in FIG. 1.

The plurality of surfaces of stops 56, 56' serves two functions. One is that with the standards 24, 24' against the stops 56, 56', pin 46 can move in a path pivoting in an arc about pins 32, 32'. The length of the arcs will depend on the distance of the face of stops 56, 56' from pins 58, 58'. A longer distance will shorten the arc and a shorter distance will make the arc longer. The compressible force-applying means 33 will force the standards 24, 24' against the stops 56, 56' and cause pin 46 to assume a position on the intersection of the two above arcs. If this arc intersection is not on the center line of beam 10, points 60, 60' will not be symmetrical about beam 10. Therefore with the plurality of surfaces on stops 56, 56', the intersecting arcs can be varied in length to cause pin 46 to be on the center line of beam 10. This variation in the settings of stops 56, 56' will thus permit adjustment necessary due to manufacturing variations. In practice if the pin 46 is below the center line, stop 56 will be rotated to shorten the distance to pin 58 whereas the stop 56' of the left-hand bottom will be rotated to lengthen the distance to pin 58'. These adjustments will cause the arc about right-hand bottom pin to lengthen and the arc about the left-hand bottom pin to shorten. The other function is that with the pin 46 on the center line of beam 10, the "pitch" of the bottoms can be adjusted. In practice to assure good entry of the bottom into the soil, the points 60, 60' of shares 21, 21' should be just slightly lower than the extreme wings 64, 64' of shares 21, 21'. Also undue wear of points 60, 60' will occur if points are considerably lower. To adjust the pitch, rotation is desired about pins 30, 30' without moving pin 46 off of the center line of beam 10. To do this, both stops 56, 56' are rotated so both are lengthened (or shortened).

Should an obstruction be encountered by the working bottom, it may swing rearwardly with the plow point moving through the area indicated by the broken line A, B, D, C. To this end it should be noted that each standard may pivot about pins 30, 30' independently of movement of the first links 26, 26', that the standard and first link may swing about the forward pivots 32, 32' independent of any movement of the standard relative to the first link, and that there may be movement about both pivot points 30, 32 and 30', 32'. Referring now to FIG. 1, if the movement of the right-hand bottom were only about point 30, the plow point 60 would move along the arc AB. If the movement were only about the point 32, the plow point would move along the arc AC. It should be noted, however, that to achieve its fully tripped position where the plow point 60 would be occupying point D, there must be rotational movement about both pivot points. As can be seen from an examination of the linkages shown in FIG. 1, to achieve rearward movement about either the pivot point 30, the pivot point 32, or about both pivot points, it will be necessary to compress the assembly 33. When the compressible force-applying means is in its fully compressed position and the plow point is in its fully tripped position (D), it can be seen that the left-hand plow will be moved to its displaced position by means of the interconnecting linkage at which point stop 62 on the first link of the right-hand bottom will engage one end of the mounting bracket 12 to limit further movement to prevent damage to the hydraulic cylinder assembly.

Figure 2:
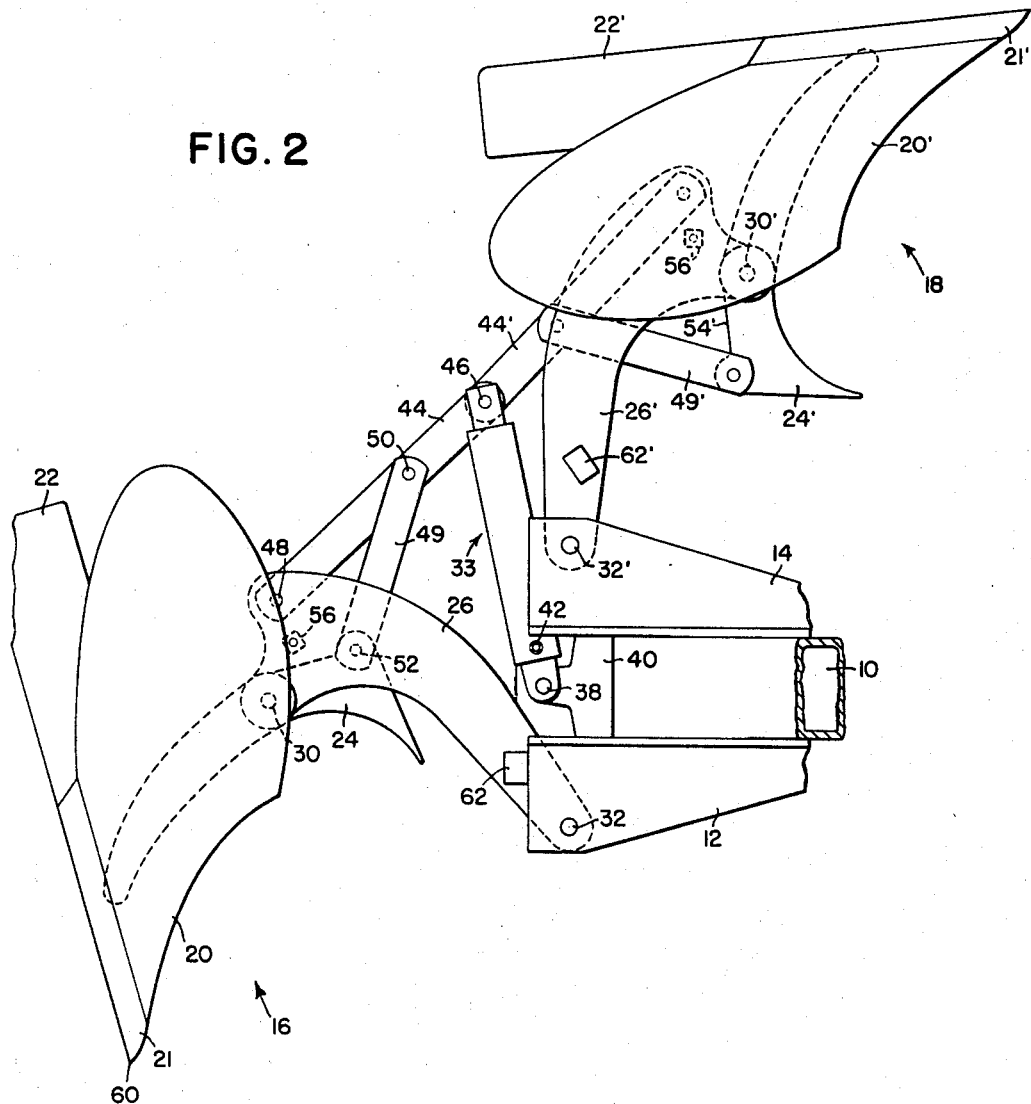
FIG. 2 is a side view of the structure shown in FIG. 1 in which the lower plow is in its fully tripped position, the upper plow being in its displaced position.

Referring to FIG. 2, in order to enable the plow bottom 16 to "plow" back into normal position after encountering an obstruction, the torque to return the standard about pin 30 is greater than the torque to return the first link 26 about pin 32. This will cause point 60 to return to its plowing position by moving first to line AC from any place in the area ABCD and then "plowing in" by following line AC to position A.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A two-way roll-over moldboard plow comprising: a generally fore-and-aft extending mounting frame, opposed right- and left-hand earth-working means rotatable with the frame between right-hand and left-hand plowing positions, standards to which at one end each of said earth-working means is rigidly interconnected, first links pivotally secured at the rear end to an intermediate portion of said standards and pivotally secured at the forward end to said mounting frame, an extensible and retractable hydraulic cylinder having its forward end pivotally secured to said mounting frame between the points of pivotal connection of the first links to the mounting frame, second links at one end pivotally secured to the rear end of said cylinder and at the other end pivotally secured to the rear end of said first link, third links at one end pivotally secured to an intermediate portion of the second link and at the other end pivotally secured to the other end of said standards, first stop means mounted on said first links and engageable with said standard, and second stop means mounted on said first link and engageable with said mounting frame to limit swinging movement in one direction.

2. The plow set forth in claim 1 in which said first stop means comprises a pin fixed to a side of said first link and a rotatable member disposed about said pin and having a plurality of stop surfaces located at varying distances from said pin.

3. A roll-over moldboard plow comprising: a rotatable fore-and-aft extending mounting frame, at least one pair of upper and lower standards pivotally interconnected to opposite sides of said mounting frame, each standard being movable between an operative working position and an inoperative tripped position, right- and left-hand bottoms rigidly secured on opposite sides of the main frame to said upper and lower standards, and a single compressible force-applying device interconnected with one pair of standards, and movable between first and second positions, said compressible force-applying device holding the standards in their operative working position when in its first position and permitting swinging of at least one of said pair of standards to a tripped inoperative position as the compressible force-applying device is moved to its second position.

4. The device set forth in claim 3 in which said compressible force-applying device is secured at one end to said mounting frame.

5. The device set forth in claim 4 in which said compressible force-applying device is a hydraulic cylinder.

6. The device set forth in claim 3 in which first link means are provided, each link being pivotally secured at one end to one of said standards, and pivotally secured at the other end to said mounting frame.

7. The device set forth in claim 6 in which adjustable stop means are disposed between each standard and the associated first link whereby relative rotational movement between each standard and the associated first link is limited in one direction.

8. The device set forth in claim 6 in which second links are pivotally interconnected at one end with said first links and pivotally interconnected at the other end with said compressible force-applying device, and third links are pivotally interconnected at one end with the upper end of each standard and pivotally interconnected at their other end with said second links.

9. The device set forth in claim 6 in which stop means are provided which are cooperable between the mounting frame and the first link to limit swinging movement of said first link in one direction.

References Cited

UNITED STATES PATENTS

| | | | |
|---|---|---|---|
| 615,210 | 11/1898 | Brown | 172—705 |
| 3,321,031 | 5/1967 | Evans | 172—605 |

ABRAHAM G. STONE, *Primary Examiner.*

W. J. CONLON, *Assistant Examiner.*